United States Patent
Fang et al.

(10) Patent No.: US 7,319,538 B1
(45) Date of Patent: Jan. 15, 2008

(54) USING EMBEDDED LINKS FOR MODIFYING PRINTING ATTRIBUTES IN A GRAPHICAL USER INTERFACE

(75) Inventors: Chi Fang, Union City, CA (US); Tetsuro Motoyama, Cupertino, CA (US)

(73) Assignee: Ricoh Company, Ltd., Tokyo (JP)

( * ) Notice: Subject to any disclaimer, the term of this patent is extended or adjusted under 35 U.S.C. 154(b) by 1069 days.

(21) Appl. No.: 10/382,683

(22) Filed: Mar. 5, 2003
(Under 37 CFR 1.47)

(51) Int. Cl.
*G06F 3/048* (2006.01)
*G06F 3/12* (2006.01)

(52) U.S. Cl. .................. 358/1.15; 715/777; 715/810

(58) Field of Classification Search ...... 358/1.12–1.15, 358/442, 468; 715/700, 771, 810, 825, 833, 715/841, 777
See application file for complete search history.

(56) References Cited

U.S. PATENT DOCUMENTS

| | | | |
|---|---|---|---|
| 6,504,556 B1 * | 1/2003 | Myers | 715/839 |
| 6,762,856 B2 * | 7/2004 | Farrell et al. | 358/1.13 |
| 6,868,189 B1 * | 3/2005 | Hoshino | 382/260 |
| 7,062,721 B2 * | 6/2006 | Jin | 715/843 |
| 7,085,000 B2 * | 8/2006 | Coleman | 358/1.15 |
| 7,159,190 B2 * | 1/2007 | Perry | 715/825 |
| 2007/0031162 A1 * | 2/2007 | Dombrowski | 399/81 |

* cited by examiner

*Primary Examiner*—Scott A. Rogers
(74) *Attorney, Agent, or Firm*—Hickman Palermo Truong & Becker LLP; Edward A. Becker

(57) ABSTRACT

A method and apparatus for using embedded links for modifying printing attributes in a graphical user interface is provided. According to one embodiment, a user interface object, which is associated with a printing attribute, is displayed on a GUI. The user interface object has an associated embedded link. In response to a user selecting the user interface object, the associated embedded link allows the modification of the printing attribute.

45 Claims, 6 Drawing Sheets

USING EMBEDDED LINKS FOR MODIFYING PRINTING ATTRIBUTES IN A GRAPHICAL USER INTERFACE

FIELD OF THE INVENTION

The present invention relates to graphical user interfaces and more specifically to using embedded links to locate controls for modifying printing attributes in a graphical user interface.

BACKGROUND OF THE INVENTION

Typically printers have various printing attributes that dictate the characteristics of a print job. For example, a user may desire that their print job be on letter sized, plain paper with a watermark across each page. In this case, the user would need to configure their print driver on their computer with the desired characteristics. For example, the user would interact with a GUI to configure their print driver with a paper type printing attribute of plain, a paper size printing attribute of letter size, and a watermark enablement printing attribute of ON. When the user prints a job, the configured print driver will instruct the appropriate printer to create the requested print job on letter sized, plain paper with a watermark across each page.

As printers are becoming more and more complex, the number of printing attributes that users need to configure is increasing. For example, today's printers not only have printing attributes that allow users to select from a number of paper types, such as plain paper, recyclable paper, transparencies, etc., but the users may specify, among other things, the trays that various paper types are in, whether watermark is enabled, the orientation of the watermark, the color of the watermark, the level of print quality, whether to collate, whether to duplex, whether pages should be stapled, and the location of the staples. As a result, the graphical user interfaces (GUIs) for configuring the print driver are also becoming more complex. For example, when users need to access a printing attribute, the users have to remember or figure out where in the complicated GUI the printing attribute is displayed and/or modified.

One approach to addressing the increasing complexity of presenting printing attributes to users is to group similar printing attributes together under a particular page that has an associated tab (referred to hereinafter as a "tabbed page"). For example, printing attributes that dictate input to a printer, such as the paper type and what tray that paper type is in, may be grouped under a tabbed page for paper, whereas, printing attributes that dictate whether watermarks are enabled and what the watermark looks like may be grouped under a tabbed page for watermarks. However, this still requires the user to remember which tabbed page particular printing attributes are located under. For example, if a user wants to modify the paper type, the user has to know that paper type may be configured under the tabbed page for paper. Therefore, an improved method for accessing printing attributes is needed.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY OF THE INVENTION

Techniques are provided for using embedded links for modifying printing attributes in a graphical user interface. According to one embodiment, a user interface object, which is associated with a printing attribute, is displayed on a GUI. The user interface object has an associated embedded link. In response to a user selecting the user interface object, the associated embedded link allows the modification of the printing attribute where the modification of the printing attribute was not allowed by the GUI prior to the user selecting the user interface object. For example, after the user selects the user interface object, the embedded link may be used to locate a control for modifying the printing attribute. The control may be displayed on the GUI and the user may modify the printing attribute by entering a new value for the printing attribute into the control.

DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

A method and apparatus for using embedded links for modifying printing attributes in a graphical user interface is described. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Functional and Structural Overview

Figure 1A:
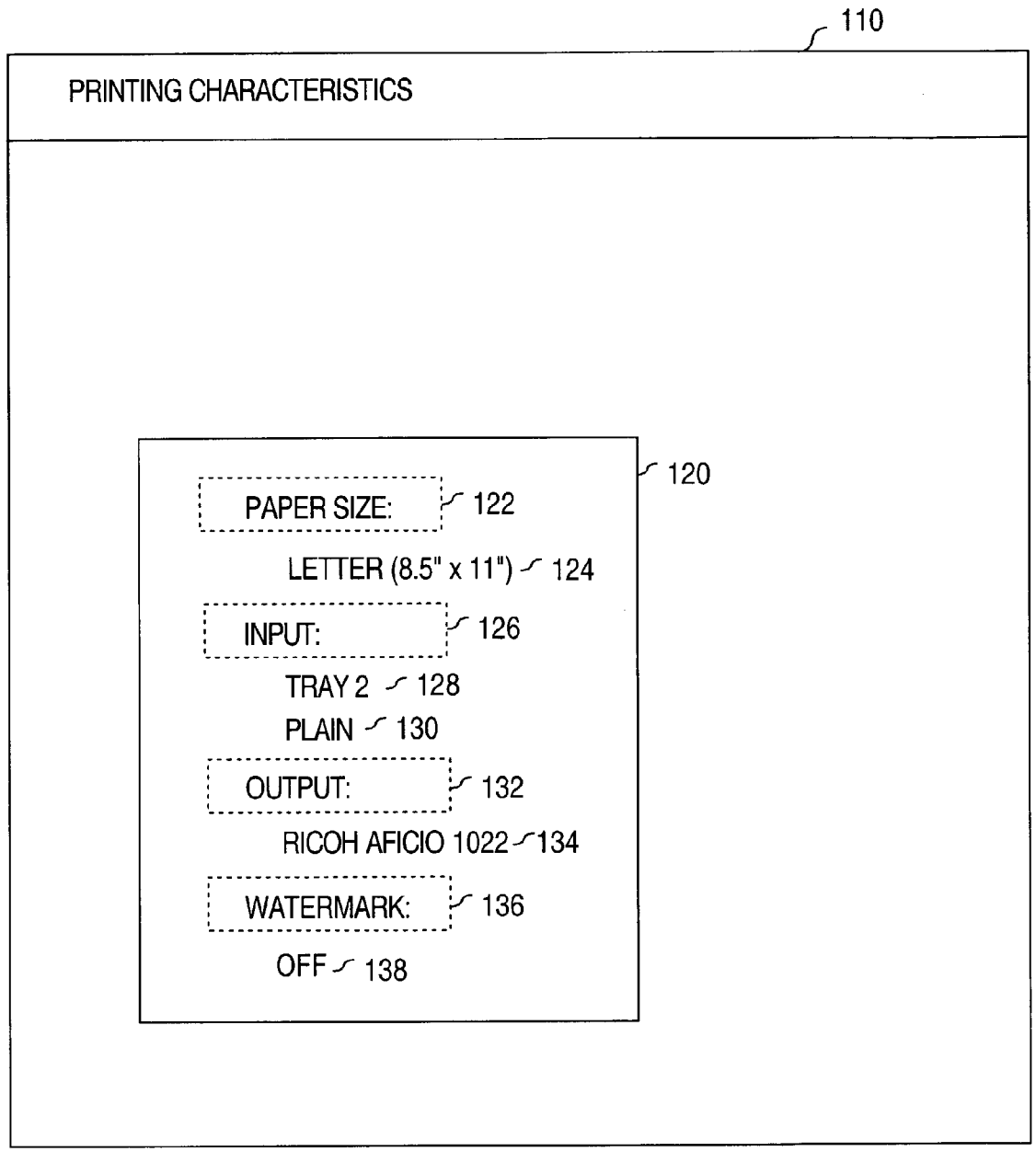
FIGS. 1A and 1B are block diagrams that depict windows in a GUI where embedded links may be used to locate controls for modifying printing attributes.
Figure 1B:
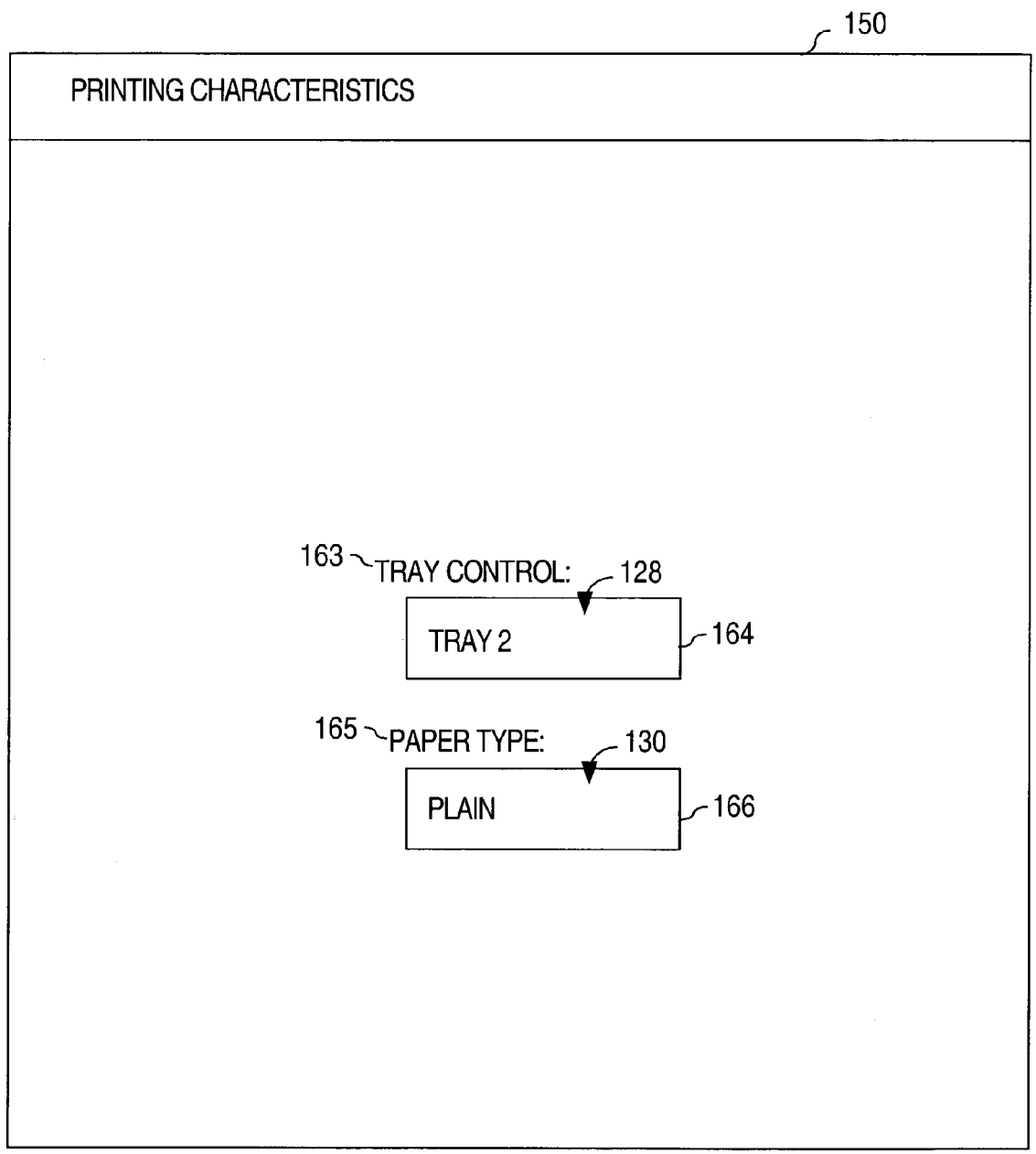

According to one embodiment, embedded links are used to locate controls for modifying printing attributes in a graphical user interface. For example, a user interface object may be associated with a printing attribute. An embedded link, which is associated with the user interface object, may be used to locate controls for modifying the value of the printing attribute. For example, when a user clicks on the user interface object, the embedded link is used to locate and present a control for modifying the value of the printing attribute to the user. As used herein, the term "control" refers to a user interface object in a GUI that allows a user to assign a value to a printing attribute. For example, a control may be an input box that a user can enter a value into and cause the GUI to assign the entered value to a printing attribute associated with the control FIGS. 1A and 1B are block diagrams that depict windows in a GUI where embedded links may be used to locate controls for modifying printing attributes, according to one embodiment. An example GUI for displaying and modifying printing attributes includes two windows (110 and 150). According to one embodiment, window 110 provides a centralized location for displaying the current values for printing attributes that are of special importance to a user. For example, the printing attributes for paper size (not shown), tray control 163, paper type 165, printer selection (not shown), and watermark enablement (not shown) are of special interest to a user and therefore, the current values for these printing attributes are displayed in window 110. Further, the paper size printing attribute (not shown) is currently set to "letter size" 124, the tray control printing attribute 163 is currently set to "tray 2" 128, the paper type printing attribute 165 is currently set to "plain" 130, the printer selection printing attribute (not shown) is currently set to the "Ricoh Aficio 1022" 134, etc. At this point, window 110 is displayed and window 150 is not displayed.

According to one embodiment, user interface objects (122, 126, 132, 136) have associated embedded links that are used to locate user interface controls for modifying the values of printing attributes. For example, if a user wants to change the current value of the paper type printing attribute 165 from plain 130 to recyclable (not shown), the user selects input user interface object 126. Selecting input user interface object 126 activities the associated embedded link. Activating the embedded link causes window 150 to be displayed and provides user access to a second user interface object, such as a control 166 that may be used to change the current value of the paper type printing attribute 165 from "plain" 130 to "recyclable" (not shown). In this example, the user may modify the value by typing "recyclable" into control 166. The use of embedded links in the manner described herein provides convenient access to user interface controls for modifying the values of printing attributes. In the present example, window 150 may not be displayed until the embedded link associated with input user interface object 126 is activated, thus modification of the paper type printing attribute 165 is not allowed by the GUI prior to the user selection of the input user interface object 126.

According to one embodiment, user interface objects may be displayed in a centralized location. For example, user interface objects for paper size 122, input 126, output 132 and watermark 136 are displayed on one window, such as window 110, in a user selection list 120. According to one embodiment, a current value for a printing attribute may be associated with a user interface object. For example, the current value, "letter size" 124, for one printing attribute, paper size (not shown), is associated with the paper size user interface object 122. According to one embodiment, the current values for more than one printing attribute may be associated with a user interface object. For example, the current values, "tray 2" 128 and "plain" 130, for two printing attributes, tray control 163 and paper type 165, are associated with the input user interface object 126.

Property Sheets

Figure 2A:
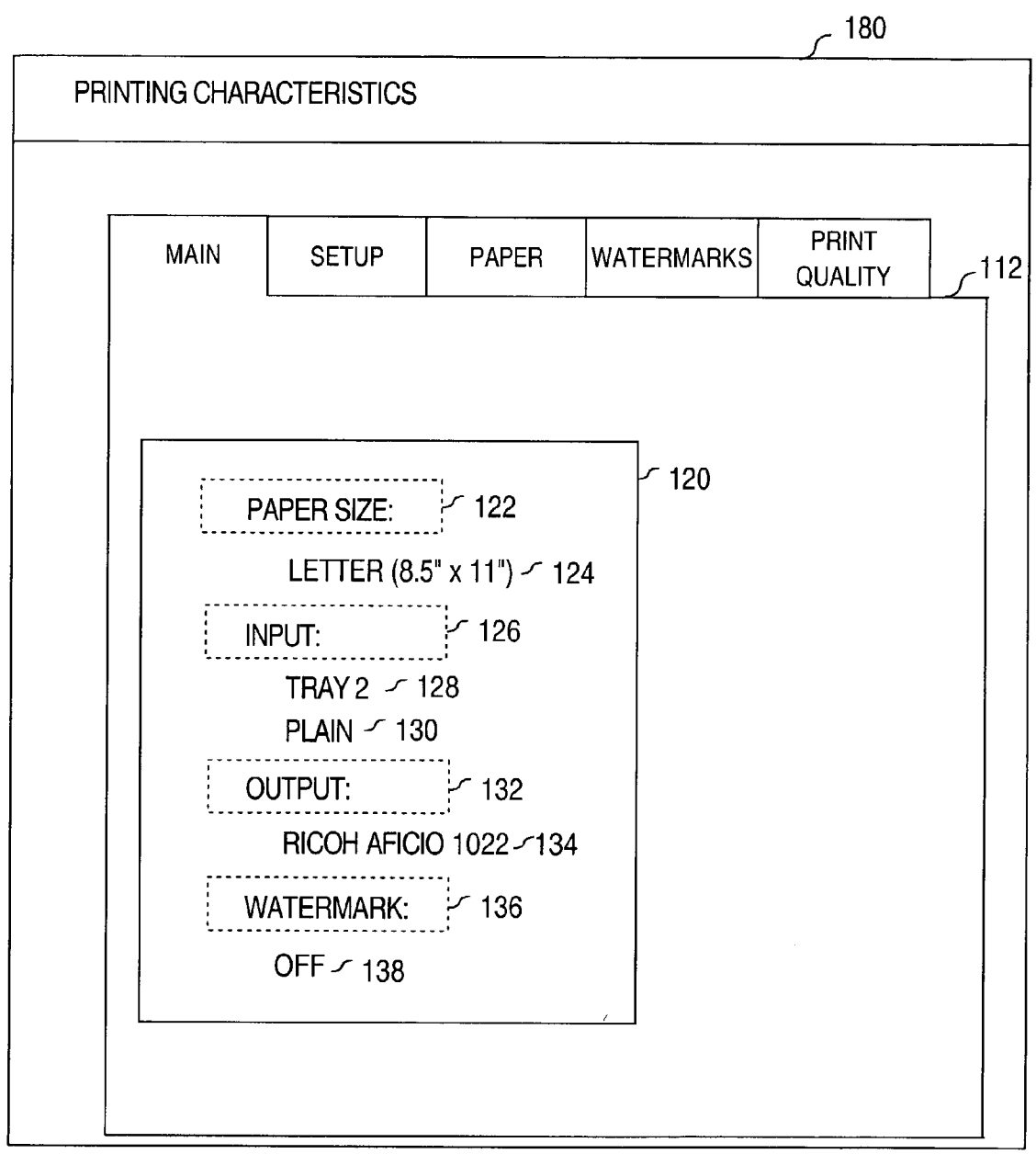
FIGS. 2A and 2B are block diagrams that depict a property sheet in a GUI configured with embedded links that are used to locate controls for modifying printing attributes under the appropriate page of the property sheet.
Figure 2B:
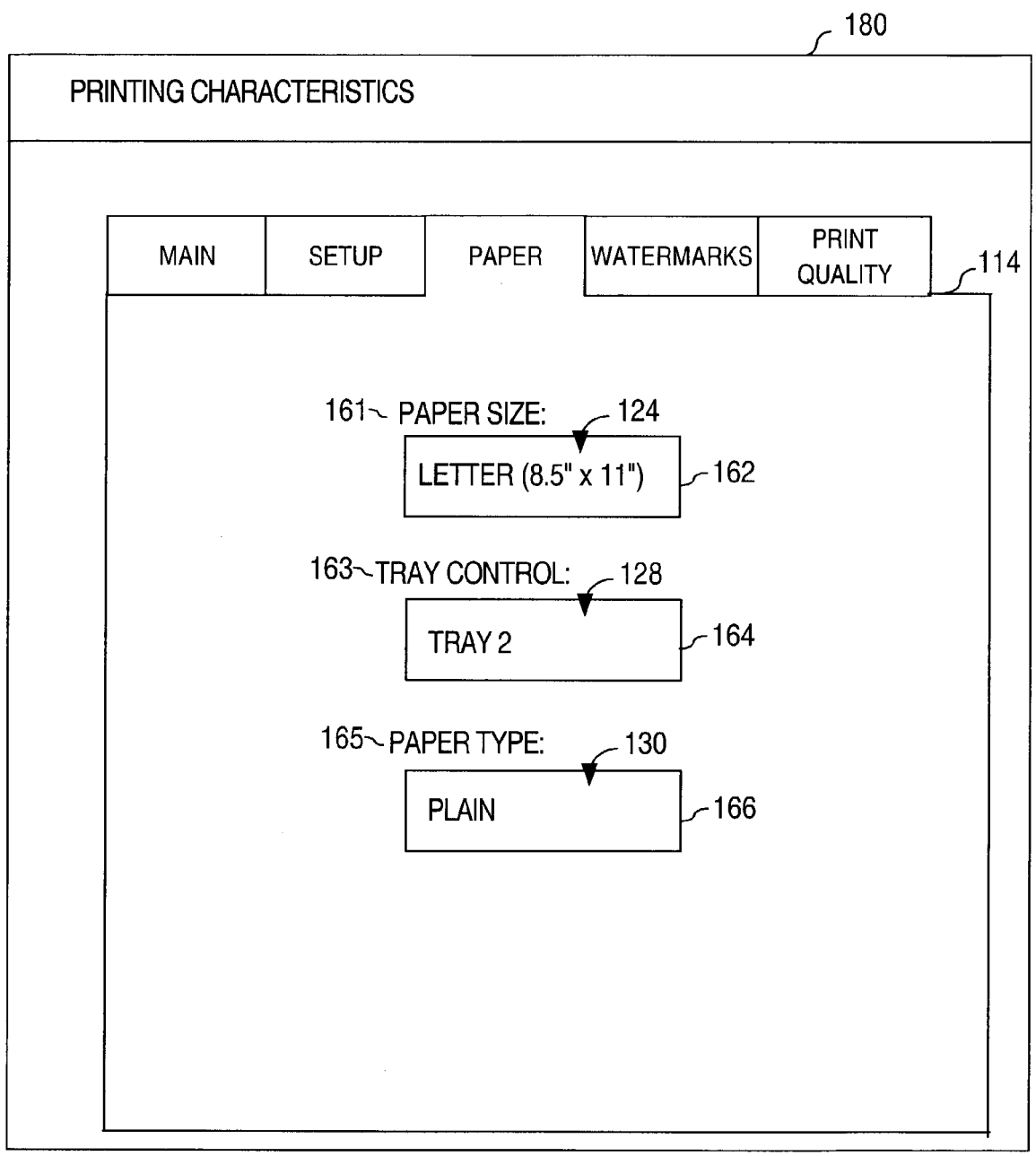

FIGS. 2A and 2B are block diagrams that depict a property sheet in a GUI configured with embedded links that are used to locate controls for modifying printing attributes under the appropriate page of the property sheet. For example, a property sheet may include one or more pages that are tabbed. A user selects a tab associated with a particular tabbed page to access the particular tabbed page and the printing attribute controls contained therein. As depicted in FIG. 2A, property sheet 180 has several tabs e.g., MAIN, SETUP, PAPER, WATERMARKS, and PRINT QUALITY, for accessing various tabbed pages. FIG. 2A depicts the main tabbed page 112 that a user may access by selecting the MAIN tab. FIG. 2B depicts the paper tabbed page 114 that a user may access by selecting the PAPER tab.

According to one embodiment, one or more printing attributes may be modified on a particular tabbed page. For example, the printing attributes paper size 161, tray control 163, and paper type 165 may be modified on the paper tabbed page 114, as depicted in FIG. 2B. The watermark enablement printing attribute (not shown) may be modified in a watermarks tabbed page (not shown).

According to one embodiment, more than one user interface object may have associated embedded links that provide access to the same tabbed page. For example, the embedded links associated with paper size user interface object 122 and input user interface object 126 may both be associated with the paper tabbed page 114 so that selecting either the paper size user interface object 122 or the input user interface object 126 causes paper tabbed page 114 to be displayed to the user.

Embedded Links

As described herein, embedded links are used for locating controls to modify printing attributes. According to one embodiment, mechanisms provided by the operating system environment in which the GUI executes may be used to implement embedded links. For example, an operating system (OS) typically monitors various events, such as the movement of a cursor or a user selecting a designated area on a GUI. The operating system provides messages, with information pertaining to the events, to specified routines. In response to receiving these messages, the specified routines perform appropriate actions based on the information in the messages. System calls to the OS provide data to the OS specifying which routines are notified for particular messages.

For example, the Microsoft Windows OS constantly monitors the position of the cursor on a window in terms of x,y pixel coordinates of the window. Further, the Microsoft Windows OS may be instructed to define an area as a user interface object in terms of x, y pixel coordinates with relationship to the window the user interface object is displayed on. The Microsoft Windows OS may also be instructed to notify a specified routine when the cursor overlaps at least a portion of the user interface object. As the user moves the cursor, the Microsoft Windows OS constantly monitors the position of the cursor in terms of x, y pixel coordinates and reports the cursor position to the specified routine. The specified routine compares the cursor position with the location of the user interface object to determine when the cursor overlaps at least a portion of the user interface object.

According to one embodiment, when a specified routine determines that the cursor overlaps at least a portion of the user interface object, the specified routine modifies the cursor's appearance. For example, when the cursor does not overlap at least a portion of the user interface object, the cursor may have the appearance of a vertical dash; however, when the cursor does overlap at least a portion of the user interface object, the specified routine may modify the appearance of the cursor to look like a human finger.

According to one embodiment, a user selection of the user interface object results in the specified routine displaying the controls for modifying printing attributes associated with the selected user interface object. For example, data may be provided to the Microsoft Windows OS instructing the OS to monitor for a user clicking on a particular user interface object. In this situation, a message, with information about the user selection, is passed to the specified routine to take appropriate action. The message indicating that a user selected the particular user interface object is passed to the specified routine. The specified routine determines which user interface object was selected and the corresponding GUI printing attributes, which correspond to the selected user interface object, that may be modified. The specified routine causes the appropriate window, tabbed page, etc., including controls for modifying the corresponding printing attributes to be displayed. According to one embodiment, a user may select the user interface object by either single or double clicking on the user interface object.

According to one embodiment, an embedded link may be used to locate a control for modifying a particular printing attribute within a subtab (not shown) of a tabbed page. For example, the control for modifying the value of the printer selection printing attribute (not shown) may be located within a subtab (not shown) of the paper tabbed page 114. In this situation, an embedded link associated with the output user interface object 132 may be used to locate the control for modifying the value of the printer selection printing attribute (not shown) on the subtab.

Although the above explanation was provided in terms of system calls made to the Microsoft Windows OS, the implementation of embedded links is not limited to any particular OS or development environment. For example, other operating systems such as Linux or SUN may be used. Further, other GUI development tools, such as JAVA or Microsoft Foundation Classes (MFC) may be used.

The Visual Appearance of the User Interface Objects

According to one embodiment, the visual appearance of a user interface object indicates whether the user interface object has an associated embedded link. For example, an area encompassing the user interface object may be highlighted, may have a border, or be hatched to provide a visual indication that the user interface object has an associated embedded link. As another example, the border surrounding the user interface object may have special kinds of edges, such as rounded edges. Other ways of indicating that a user interface object has an associated embedded link include, but are not limited to, using a particular color or font with the user interface object. Similarly, the user interface object may be underlined, presented in bold print or italics.

Associating More than One Printing Attribute with a User Interface Object

According to one embodiment, more than one printing attribute is associated with a particular user interface object. For example, referring to FIGS. 1A and 1B, the tray control printing attribute 163 and the paper type printing attribute 165 are both associated with the input user interface object 126. According to one embodiment, when a user selects a user interface object that has more than one printing attribute associated with it, the cursor is placed on a particular control for modifying one of the printing attributes. For example, if a user selects the input user interface object 126, the cursor may be placed on the control 164, allowing the user to immediately modify the value associated with the tray control printing attribute 163 by entering a new value. Since the cursor is initially placed on the control 164 after selecting the input user interface object 126, the user will need to select control 166, e.g., using the mouse or other printing device, to move the cursor to control 166 if modification of the paper type printing attribute 165 is desired.

Determining Printing Attributes that are of Special Interest to a User

According to one embodiment, user interface objects for printing attributes of special interest are displayed in a centralized location. For the purposes of illustration, refer to FIGS. 2A and 2B. For example, FIG. 2A illustrates user interface objects (122, 126, 132, 136) associated with printing attributes of special interest. Referring to FIG. 2B, the printing attributes of special interest are paper size 161, tray control 163, paper type 165, printer selection (not shown), and watermark enablement (not shown).

Data indicating which printing attributes are of special interest may be pre-configured or user specified. For example, the GUI for a print driver may enable a user to specify print attributes of interest. According to another embodiment, user interface objects for the last N number of most recently modified printing attributes are displayed in a centralized location. For example, assume that N=2. If a user modifies paper size printing attribute 161, the centralized location depicts a paper size user interface object 122. If the user subsequently modifies the tray control printing attribute 163, the centralized location depicts user interface objects for paper size 122 and input 126. If the user subsequently modifies the watermark enablement printing attribute (not shown), the centralized location depicts user interface objects for input 126 and watermark 136. The paper size user interface object 122 is no longer depicted since N=2.

Displaying the Printing Attribute

According to one embodiment, the current values of printing attributes are displayed using various user interface objects, such as icons, graphs, sliding bars, or displayed values. For example, one icon may indicate that the paper size printing attribute is currently set to legal size, whereas, a different icon, may indicate that the paper size printing attribute is currently set to letter size. In a second example involving a save toner printing attribute (not shown), a sliding bar may be used to display the percentage of toner currently available. In yet another example, a graph may display the percentage of toner that will be used over time when the save toner printing attribute is turned on verses the percentage of toner that will be used over time when the save toner printing attribute is turned off. Lastly, the current value of a printing attribute may simply be displayed. For example, the current value may be displayed as "ON", "OFF", a number, or a string value, such as "letter size".

According to one embodiment, the current values of printing attributes are displayed in the same location in the GUI that allows modification of the printing attribute, thus, providing a user with information to help the user determine how to modify the printing attribute. For example, a graph displaying the percentage of toner saved over time may be displayed on the same page that includes a control for modifying the save toner printing attribute.

An Operational Example

Figure 3:
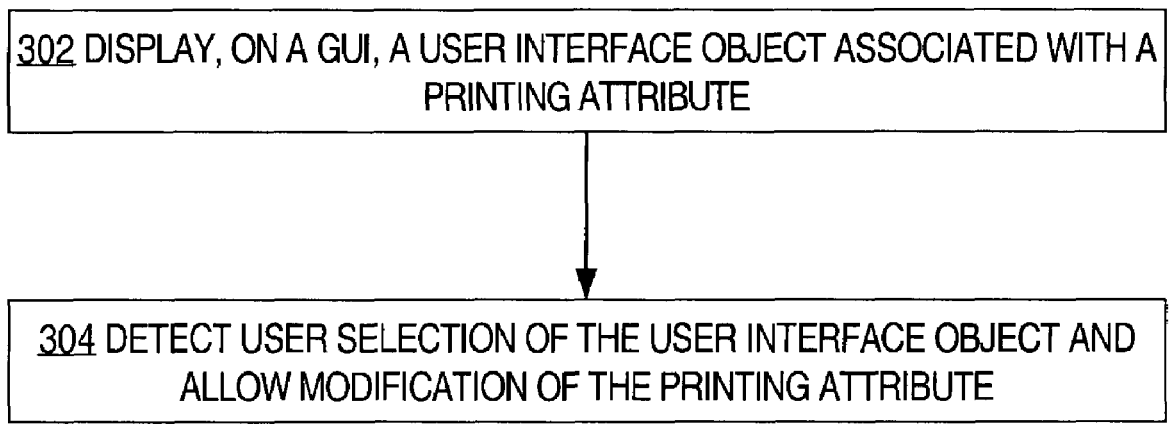
FIG. 3 is a flow diagram that depicts a high level overview of a method for using embedded links for modifying printing attributes in a graphical user interface.

FIG. 3 is a flow diagram that depicts a high level overview of a method for using embedded links for modifying printing attributes in a graphical user interface, according to one embodiment. For the purposes of explanation, it is assumed that the GUI, as depicted in FIGS. 2A and 2B, is running on a Microsoft Windows OS. Additionally, it is assumed that system calls have been made to the Microsoft Windows OS defining an area encompassing the input user interface object 126 and providing data to the Microsoft Windows OS specifying that an event handler routine A is to be invoked when a user selects the input user interface object 126. Further, this data also specifies that a message, with information describing the selection of the input user interface object 126, is passed to the event handler routine A. As previously discussed, when more than one printing attribute is associated with a user interface object, the cursor is initially placed on a control for one of the printing attributes. Since the input user interface object 126 is associated with two printing attributes (163, 165), it is assumed that the cursor will be placed initially on control 164 when the input user interface object 126 is selected.

At step 302, a user interface object, which is associated with a printing attribute, is displayed on a GUI. For example, referring to FIG. 2A, the input user interface object 126 is displayed on a main tabbed page 112 of a GUI. As previously discussed, the printing attributes tray control 163 and paper type 165, depicted in FIG. 2B, are associated with the input user interface object 126. The printing attribute paper size 161 is associated with the paper size user interface object 122. The user interface object input 126 is highlighted, which indicates that the input user interface object 126 has an associated embedded link.

At step 304, when a user selects a user interface object, the embedded link that is associated with the user interface object is used to locate and display one or more printing attributes, allowing modification of the printing attributes. For example, when a user selects the input user interface object 126, the Microsoft Windows OS uses the data, which correlates event handler routine A with the input user interface object 126, to locate event handler routine A. The Microsoft Windows OS invokes the event handler routine A and passes a message, which includes information describing the selection of the input user interface object 126, to the event handler routine A.

Event handler routine A has logic specifying the second user interface object which may be used for modifying the printing attributes associated with the input user interface object 126. In this example, the second user interface object is control 164. Since control 164 is on the paper tabbed page 114, the executed logic of event handler routine A causes the paper tabbed page 114 to be displayed, causing control 164 to be displayed. A user may modify the tray control printing attribute 163 by entering a new value into control 164. The paper tabbed page 114 was displayed in response to the user selection of the input user interface object 126, allowing modification of the tray control printing attribute 163.

The architecture and processes described herein provide for modifying printing attributes in a graphical user interface using embedded links. A printing attribute is associated with a user interface object. According to one embodiment, the user interface object has an associated embedded link, which may be used to allow for the modification of the printing attribute. For example, in selecting the user interface object, the associated embedded link is used to locate and display a second user interface object that may be used for modifying the value of the printing attribute. Assuming the second user interface object is a control for entering a new value, a user may modify the value of the printing attribute by typing a new value into the control.

In associating an embedded link with a user selectable user interface object, complicated GUIs are easier to navigate because, among other things, user interface objects for printing attributes of special interest may be displayed in a centralized location and users are not required to remember where controls for modifying the printing attributes of special interest are located.

Although the examples provided herein describe modifying printing attributes by entering values into a control, any GUI mechanism for assigning a value to a variable may be used. Examples of these GUI mechanisms include, but are not limited to, pull down lists, button controls, and sliding scales.

Figure 4:
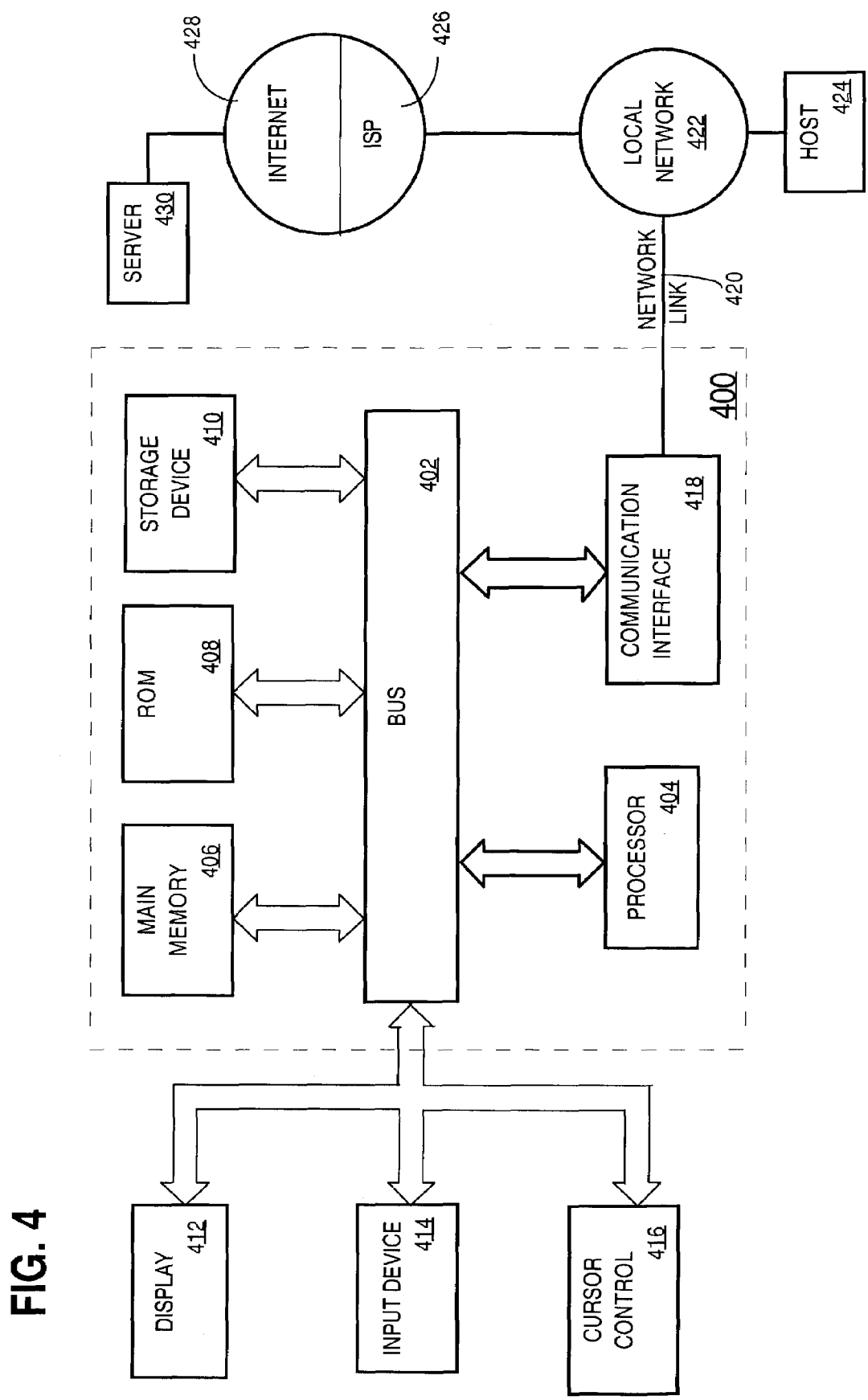
FIG. 4 is a block diagram that depicts a computer system upon which an embodiment of the invention may be implemented.

FIG. 4 is a block diagram that depicts a computer system upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for implementing the techniques described herein. According to one embodiment of the invention, those techniques are performed by computer system 400 in response to processor 404 executing one or more sequences of one or more instructions contained in main memory 406. Such instructions may be read into main memory 406 from another computer-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards; papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution. In this manner, computer system 400 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for modifying a printing attribute on a graphical user interface (GUI), the method comprising the computer-implemented steps of:

displaying, on the GUI, a plurality of user interface objects that represent a plurality of overlapping tabbed pages, wherein a first tabbed page from the plurality of tabbed pages is displayed on top of and substantially covers the other tabbed pages from the plurality of tabbed pages;

displaying, on the GUI, with one or more of the plurality of user interface objects that represent the first tabbed page, a user interface object associated with the printing attribute, wherein the user interface object has an associated embedded link, and wherein the visual appearance of the user interface object indicates that the user interface object has the associated embedded link; and in response to a user selection of the user interface object, using the associated embedded link to cause one or more other user interface objects that represent a second tabbed page from the plurality of tabbed pages to be displayed on the GUI on top of and substantially covering the other tabbed pages from the plurality of tabbed pages, wherein the second tabbed page includes one or more controls for modifying the printing attribute, and allow modification of the printing attribute via the one or more controls included on the second tabbed page displayed on the GUI, wherein modification of the printing attribute was not allowed by the GUI prior to the user selection of the user interface object and display of the second tabbed page.

2. The method of claim 1, wherein the associated embedded link is used to display a set of one or more additional user interface objects on the GUI with the printing attribute.

3. The method of claim 1, wherein the user interface object is a first user interface object and the printing attribute is a first printing attribute, and wherein the method further comprises the computer-implemented step of:

displaying, on the GUI, the first user interface object and a second user interface object that is associated with a second printing attribute.

4. The method of claim 3, wherein the associated embedded link is a first associated embedded link and the second user interface object has a second associated embedded link, and wherein the method further comprises the computer-implemented step of:

in response to a user selection of the second user interface object using the second associated embedded link to allow modification of the second printing attribute on the GUI, wherein modification of the second printing attribute was not allowed by the GUI prior to the user selection of the second user interface object.

5. The method of claim 1, wherein the user interface object is one user interface object displayed in a list of user interface objects, and wherein the step of displaying, on the GUI, the user interface object further comprises the step of:
displaying, on the GUI, the user interface object in the list of user interface objects.

6. The method of claim 1, wherein a plurality of printing attributes are associated with the user interface object and wherein the method further comprises the computer-implemented step of:
in response to the user selection of the user interface object, using the associated embedded link to allow modification of the plurality of printing attributes on the GUI, wherein modification of the plurality of printing attributes was not allowed by the GUI prior to the user selection of the user interface object.

7. The method of claim 1, further comprising the computer-implemented step of:
in response to detecting that a GUI pointing object satisfies location criteria with respect to the user interface object, changing the visual appearance of the GUI pointing object.

8. The method of claim 7, wherein the location criteria includes that the GUI pointing object overlaps at least a portion of the user interface object.

9. The method of claim 7, wherein the GUI pointing object is a cursor.

10. The method of claim 1, wherein the printing attribute is selected from a group of printing attributes that include a paper size printing attribute, a tray selection printing attribute, a paper type printing attribute, a printer selection printing attribute, and a watermark enablement printing attribute.

11. The method of claim 1, wherein the user interface object is a first user interface object, and wherein the printing attribute is displayed as a second user interface object and wherein the second user interface object is selected from a group of user interface objects that include an icon, a graph, a sliding bar, and a displayed value.

12. The method of claim 1, wherein the user interface object is a first user interface object and wherein the visual appearance of a second user interface object does not indicate that the second user interface object has an associated embedded link.

13. The method of claim 1, wherein the user interface object is a first user interface object, and wherein the method further comprises the computer-implemented steps of:
associating data with the embedded link, wherein the data correlates a routine with the first user interface object;
in response to the user selection of the first user interface object, using the data to locate the routine; and
executing the logic of the routine to display a second user interface object that allows modification of the printing attribute.

14. The method of claim 1, wherein the user interface object is a first user interface object and the method further comprises the computer-implemented step of:
in response to the user selection of the first user interface object, displaying a second user interface object that allows modification of the printing attribute.

15. The method as recited in claim 1, further comprising:
displaying on the first tabbed page, a second user interface object that is different than the user interface object, wherein the second user interface object is associated with a second printing attribute and has an associated embedded link, and wherein the visual appearance of the second user interface object indicates that the second user interface object has the associated embedded link; and
in response to a user selection of the second user interface object, using the associated embedded link to
cause one or more other user interface objects that represent a third tabbed page from the plurality of tabbed pages to be displayed on the GUI on top of and substantially covering the other tabbed pages from the plurality of tabbed pages, wherein the third tabbed page includes one or more controls for modifying the second printing attribute, and
allow modification of the second printing attribute via the one or more controls included on the third tabbed page displayed on the GUI, wherein modification of the second printing attribute was not allowed by the GUI prior to the user selection of the second user interface object and display of the third tabbed page.

16. A computer-readable medium for modifying a printing attribute on a graphical user interface (GUI), the computer-readable medium carrying one or more sequences of instructions which, when executed by one or more processors, cause the one or more processors to perform the steps of:
displaying, on the GUI, a plurality of user interface objects that represent a plurality of overlapping tabbed pages, wherein a first tabbed page from the plurality of tabbed pages is displayed on top of and substantially covers the other tabbed pages from the plurality of tabbed pages;
displaying, on the GUI, with one or more of the plurality of user interface objects that represent the first tabbed page, a user interface object associated with the printing attribute, wherein the user interface object has an associated embedded link, and wherein the visual appearance of the user interface object indicates that the user interface object has the associated embedded link; and
in response to a user selection of the user interface object, using the associated embedded link to
cause one or more other user interface objects that represent a second tabbed page from the plurality of tabbed pages to be displayed on the GUI on top of and substantially covering the other tabbed pages from the plurality of tabbed pages, wherein the second tabbed page includes one or more controls for modifying the printing attribute, and
allow modification of the printing attribute via the one or more controls included on the second tabbed page displayed on the GUI, wherein modification of the printing attribute was not allowed by the GUI prior to the user selection of the user interface object and display of the second tabbed page.

17. The computer-readable medium of claim 16, wherein the associated embedded link is used to display a set of one or more additional user interface objects on the GUI with the printing attribute.

18. The computer-readable medium of claim 16, wherein the user interface object is a first user interface object and the printing attribute is a first printing attribute, and wherein the instructions, when executed by one or more processors, cause the one or more processors to carry out the computer-implemented step of displaying, on the GUI, the first user interface object and a second user interface object that is associated with a second printing attribute.

19. The computer-readable medium of claim 18, wherein the associated embedded link is a first associated embedded link and the second user interface object has a second associated embedded link, and wherein the instructions, when executed by one or more processors, cause the one or more processors to carry out the computer-implemented step of:

in response to a user selection of the second user interface object using the second associated embedded link to allow modification of the second printing attribute on the GUI, wherein modification of the second printing attribute was not allowed by the GUI prior to the user selection of the second user interface object.

20. The computer-readable medium of claim 16, wherein the user interface object is one user interface object displayed in a list of user interface objects, and wherein the instructions, for displaying, on the GUI, the user interface object further comprises instructions, when executed by one or more processors, cause the one or more processors to carry out the computer-implemented step of displaying, on the GUI, the user interface object in the list of user interface objects.

21. The computer-readable medium of claim 16, wherein a plurality of printing attributes are associated with the user interface object and wherein the instructions, when executed by one or more processors, cause the one or more processors to carry out the computer-implemented step of:

in response to the user selection of the user interface object, using the associated embedded link to allow modification of the plurality of printing attributes on the GUI, wherein modification of the plurality of printing attributes was not allowed by the GUI prior to the user selection of the user interface object.

22. The computer-readable medium of claim 16, further comprising instructions, when executed by one or more processors, cause the one or more processors to carry out the computer-implemented step of:

in response to detecting that a GUI pointing object satisfies location criteria with respect to the user interface object, changing the visual appearance of the GUI pointing object.

23. The computer-readable medium of claim 22, wherein the location criteria includes that the GUI pointing object overlaps at least a portion of the user interface object.

24. The computer-readable medium of claim 22, wherein the GUI pointing object is a cursor.

25. The computer-readable medium of claim 16, wherein the printing attribute is selected from a group of printing attributes that include a paper size printing attribute, a tray selection printing attribute, a paper type printing attribute, a printer selection printing attribute, and a watermark enablement printing attribute.

26. The computer-readable medium of claim 16, wherein the user interface object is a first user interface object, and wherein the printing attribute is displayed as a second user interface object and wherein the second user interface object is selected from a group of user interface objects that include an icon, a graph, a sliding bar, and a displayed value.

27. The computer-readable medium of claim 16, wherein the user interface object is a first user interface object and wherein the visual appearance of a second user interface object does not indicate that the second user interface object has an associated embedded link.

28. The computer-readable medium of claim 16, wherein the user interface object is a first user interface object, and wherein the instructions, when executed by one or more processors, cause the one or more processors to carry out the computer-implemented steps of:

associating data with the embedded link, wherein the data correlates a routine with the first user interface object;

in response to the user selection of the first user interface object, using the data to locate the routine; and executing the logic of the routine to display a second user interface object that allows modification of the printing attribute.

29. The computer-readable medium of claim 16, wherein the user interface object is a first user interface object and wherein the instructions, when executed by one or more processors, cause the one or more processors to carry out the computer-implemented step of:

in response to the user selection of the first user interface object, displaying a second user interface object that allows modification of the printing attribute.

30. The computer-readable medium as recited in claim 16, wherein the instructions, when executed by one or more processors, cause the one or more processors to carry out the computer-implemented steps of:

displaying on the first tabbed page, a second user interface object that is different than the user interface object, wherein the second user interface object is associated with a second printing attribute and has an associated embedded link, and wherein the visual appearance of the second user interface object indicates that the second user interface object has the associated embedded link; and in response to a user selection of the second user interface object, using the associated embedded link to cause one or more other user interface objects that represent a third tabbed page from the plurality of tabbed pages to be displayed on the GUI on top of and substantially covering the other tabbed pages from the plurality of tabbed pages, wherein the third tabbed page includes one or more controls for modifying the second printing attribute, and allow modification of the second printing attribute via the one or more controls included on the third tabbed page displayed on the GUI, wherein modification of the second printing attribute was not allowed by the GUI prior to the user selection of the second user interface object and display of the third tabbed page.

31. A computer system comprising a memory that includes one or more sequences of instructions which, when executed by one or more processors, cause the one or more processors to perform the steps of:

displaying, on the GUI, a plurality of user interface objects that represent a plurality of overlapping tabbed pages, wherein a first tabbed page from the plurality of tabbed pages is displayed on top of and substantially covers the other tabbed pages from the plurality of tabbed pages;

displaying, on the GUI, with one or more of the plurality of user interface objects that represent the first tabbed page, a user interface object associated with the printing attribute, wherein the user interface object has an associated embedded link, and wherein the visual appearance of the user interface object indicates that the user interface object has the associated embedded link; and in response to a user selection of the user interface object, using the associated embedded link to cause one or more other user interface objects that represent a second tabbed page from the plurality of tabbed pages to be displayed on the GUI on top of and substantially covering the other tabbed pages from the plurality of tabbed pages, wherein the second tabbed page includes one or more controls for modifying the printing attribute, and allow modification of the printing attribute via the one or more controls included on the second tabbed page displayed on the GUI, wherein modification of the printing attribute was not allowed by the GUI prior to the user selection of the user interface object and display of the second tabbed page.

32. The computer system of claim 31, wherein the associated embedded link is used to display a set of one or more additional user interface objects on the GUI with the printing attribute.

33. The computer system of claim 31, wherein the user interface object is a first user interface object and the printing attribute is a first printing attribute, and wherein the instructions, when executed by one or more processors, cause the one or more processors to carry out the computer-implemented step of displaying, on the GUI, the first user interface object and a second user interface object that is associated with a second printing attribute.

34. The computer system of claim 33, wherein the associated embedded link is a first associated embedded link and the second user interface object has a second associated embedded link, and wherein the instructions, when executed by one or more processors, cause the one or more processors to carry out the computer-implemented step of:

in response to a user selection of the second user interface object using the second associated embedded link to allow modification of the second printing attribute on the GUI, wherein modification of the second printing attribute was not allowed by the GUI prior to the user selection of the second user interface object.

35. The computer system of claim 31, wherein the user interface object is one user interface object displayed in a list of user interface objects, and wherein the instructions, for displaying, on the GUI, the user interface object further comprises instructions, when executed by one or more processors, cause the one or more processors to carry out the computer-implemented step of displaying, on the GUI, the user interface object in the list of user interface objects.

36. The computer system of claim 31, wherein a plurality of printing attributes are associated with the user interface object and wherein the instructions, when executed by one or more processors, cause the one or more processors to carry out the computer-implemented step of:

in response to the user selection of the user interface object, using the associated embedded link to allow modification of the plurality of printing attributes on the GUI, wherein modification of the plurality of printing attributes was not allowed by the GUI prior to the user selection of the user interface object.

37. The computer system of claim 31, further comprising instructions, when executed by one or more processors, cause the one or more processors to carry out the computer-implemented step of:

in response to detecting that a GUI pointing object satisfies location criteria with respect to the user interface object, changing the visual appearance of the GUI pointing object.

38. The computer system of claim 37, wherein the location criteria includes that the GUI pointing object overlaps at least a portion of the user interface object.

39. The computer system of claim 37, wherein the GUI pointing object is a cursor.

40. The computer system of claim 31, wherein the printing attribute is selected from a group of printing attributes that include a paper size printing attribute, a tray selection printing attribute, a paper type printing attribute, a printer selection printing attribute, and a watermark enablement printing attribute.

41. The computer system of claim 31, wherein the user interface object is a first user interface object, and wherein the printing attribute is displayed as a second user interface object and wherein the second user interface object is selected from a group of user interface objects that include an icon, a graph, a sliding bar, and a displayed value.

42. The computer system of claim 31, wherein the user interface object is a first user interface object and wherein the visual appearance of a second user interface object does not indicate that the second user interface object has an associated embedded link.

43. The computer system of claim 31, wherein the user interface object is a first user interface object, and wherein the instructions, when executed by one or more processors, cause the one or more processors to carry out the computer-implemented steps of:

associating data with the embedded link, wherein the data correlates a routine with the first user interface object;

in response to the user selection of the first user interface object, using the data to locate the routine; and executing the logic of the routine to display a second user interface object that allows modification of the printing attribute.

44. The computer system of claim 31, wherein the user interface object is a first user interface object and wherein the instructions, when executed by one or more processors, cause the one or more processors to carry out the computer-implemented step of:

in response to the user selection of the first user interface object, displaying a second user interface object that allows modification of the printing attribute.

45. The computer system of claim 31, wherein the memory further comprises instructions which, when executed by the one or more processors, cause the one or more processors to carry out the computer-implemented steps of:

displaying on the first tabbed page, a second user interface object that is different than the user interface object, wherein the second user interface object is associated with a second printing attribute and has an associated embedded link, and wherein the visual appearance of the second user interface object indicates that the second user interface object has the associated embedded link; and in response to a user selection of the second user interface object, using the associated embedded link to cause one or more other user interface objects that represent a third tabbed page from the plurality of tabbed pages to be displayed on the GUI on top of and substantially covering the other tabbed pages from the plurality of tabbed pages, wherein the third tabbed page includes one or more controls for modifying the second printing attribute, and allow modification of the second printing attribute via the one or more controls included on the third tabbed page displayed on the GUI, wherein modification of the second printing attribute was not allowed by the GUI prior to the user selection of the second user interface object and display of the third tabbed page.

* * * * *

UNITED STATES PATENT AND TRADEMARK OFFICE
CERTIFICATE OF CORRECTION

PATENT NO.        : 7,319,538 B1
APPLICATION NO.   : 10/382683
DATED             : January 15, 2008
INVENTOR(S)       : Chi Fang Page 1 of 1

It is certified that error appears in the above-identified patent and that said Letters Patent is hereby corrected as shown below:

On the Title page of U.S. Patent 7,319,538 B1

Section (75) Inventors: delete "Tetsuro Motoyama".
(Mr. Motoyama is a legal representative of Ricoh Company, Ltd., and not an Inventor).

Signed and Sealed this

Twentieth Day of May, 2008

JON W. DUDAS
*Director of the United States Patent and Trademark Office*